June 16, 1964 J. H. McCAULEY ETAL Re. 25,603

INDICATOR TUBE

Original Filed Nov. 2, 1959

INVENTORS
JOHN H. McCAULEY
STEVEN GAVURNIK
BY Robert A. Green
ATTORNEY

United States Patent Office

Re. 25,603
Reissued June 16, 1964

25,603
INDICATOR TUBE

John H. McCauley, Union County, and Steven Gavurnik, Somerset County, N.J., assignors to Burroughs Corporation, Detroit, Mich., a corporation of Michigan Original No. 3,042,826, dated July 3, 1962, Ser. No. 850,236, Nov. 2, 1959. Application for reissue Oct. 2, 1963, Ser. No. 313,730
11 Claims. (Cl. 313—109.5)

Figure 2:
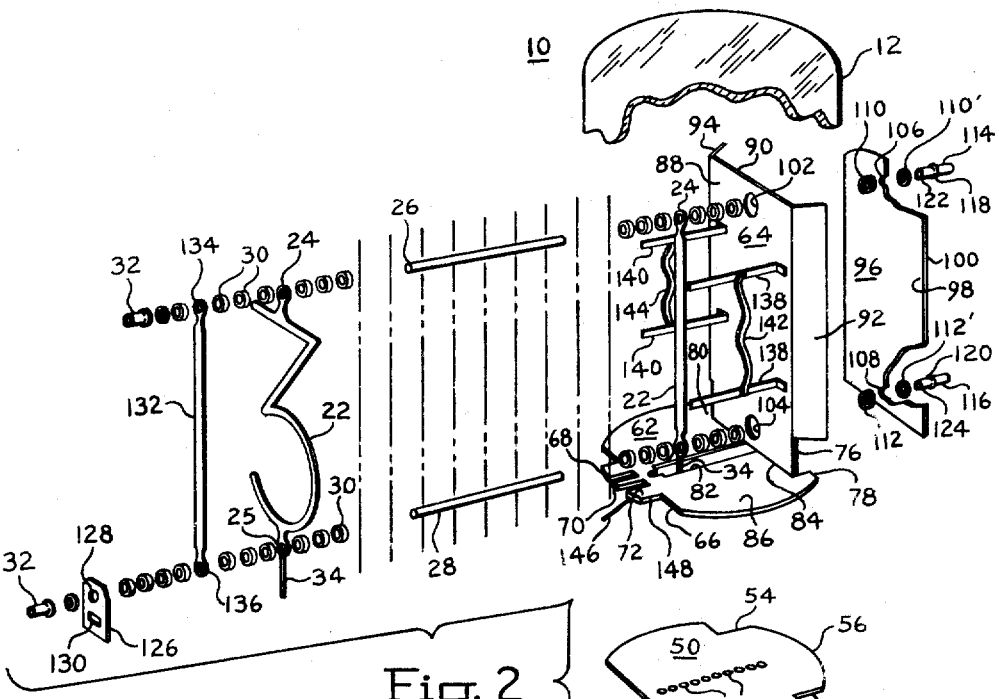

Matter enclosed in heavy brackets [ ] appears in the original patent but forms no part of this reissue specification; matter printed in italics indicates the additions made by reissue.

This invention relates to cold cathode gaseous indicator tubes.

A cold cathode gaseous indicator tube generally includes an envelope having a viewing window and containing a plurality of filamentary cathodes which are adapted to glow when an appropriate electrical potential is applied thereto. One type of indicator tube includes a stack of cathode electrodes oriented in planes transverse to the longitudinal axis of the envelope and facing the viewing window. Such a tube is defined as an end view or top view tube. It has been found that in some applications it is desirable to utilize an indicator tube having cathode electrodes which are oriented in planes parallel to the longitudinal axis of the envelope. Such a tube is defined as a side view tube and allows the cathode electrodes to be elongated and enlarged without unduly enlarging the envelope and other component parts of the tube.

Side view cold cathode indicator tubes are disclosed in the prior art. However, such known tubes are, in general, not highly efficient and are of a construction which is not readily adapted to mass production manufacture.

Accordingly, the purposes and objects of the present invention are concerned with the provision of an improved cold cathode gaseous indicator tube known as a side view tube in which cathode glow electrodes are oriented parallel to the longitudinal axis of the tube envelope and facing a viewing window in the side wall of the envelope.

Briefly, the principles and objects of the invention are embodied in a cold cathode, gaseous indicator tube comprising an envelope containing a gaseous atmosphere adapted to sustain cathode glow and including an electrode support bracket which carries means for supporting a stack of filamentary cathode glow electrodes. The support for the cathode electrodes is of cantilever construction, and includes auxiliary means for bracing and supporting the electrode assembly to provide a rigid construction.

Figure 1:
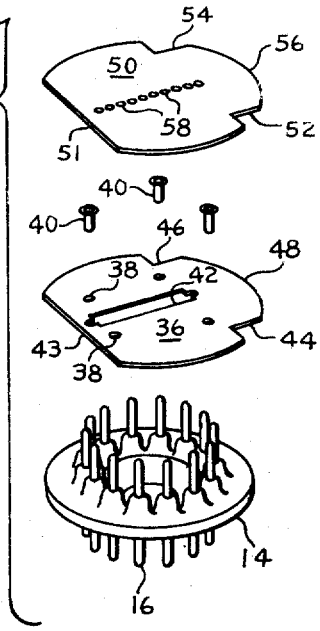
Figure 1:
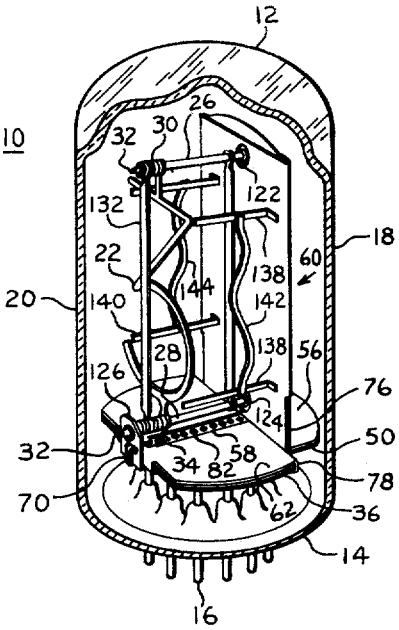

The invention is described in greater detail by reference to the drawing wherein:

FIG. 1 is a perspective view, partly in section, of a tube embodying the invention; and FIG. 2 is an exploded view of the tube of FIG. 1.

Referring to the drawings, a side-view gaseous indicator glow tube 10 embodying the invention includes an envelope 12 which has been evacuated of air and filled with a gas suitable for supporting cold cathode glow. Such a gas may be argon, neon, or the like at a suitable pressure which may be in the range of about 30 to about 100 mm. of Hg. The envelope 12 is generally elongated with its longitudinal axis oriented vertically. The envelope includes a base portion, or stem 14, through which metal base pins 16 extend and by means of which electrical connection is made to suitable external electrical circuit elements. The pins 16 extend to substantially the same height within the envelope and terminate in a common plane which is transverse to the longitudinal axis of the envelope. The envelope 12 also includes a side wall

18 sealed to the stem 14. The side wall may be entirely transparent or it may include a limited region which is transparent and which comprises a viewing window 20 through which glowing cathode indicator electrodes 22 are viewed. The cathodes 22 are thus aligned with the viewing window 20. A sealed-off exhaust tubulation (not shown) is provided in the stem 14.

The cathode glow indicator electrodes 22 of the tube 10 may take substantially any desired shape; for example, they may be numbers, letters, or the like, and they may be as few in number as desired, or as many as is practical for the size of the tube. In one form of the tube 10 wherein the glow cathode indicator electrodes are numbers, ten of such electrodes are provided, including the numbers "0" to "9." Fewer than ten glow cathodes are shown for purposes of simplification of the drawings. The cathode indicator electrodes 22 are made of any suitable metal, for example, stainless steel, aluminum, Nichrome, molybdenum, or the like, and they may be made in any suitable fashion, for example, by etching, stamping, or the like.

The cathode electrodes 22 are provided with diametrically opposed upper and lower apertured end tabs 24 and 25, respectively, by means of which they are mounted and supported on upper and lower insulated support posts 26 and 28 to be described further below. The cathodes are stacked on the posts 26 and 28 with their surfaces oriented parallel to each other, parallel to the vertical axis of the tube and facing the viewing window 20 of the envelope 12. The cathodes 22 are mounted on the posts with suitable insulating spacers 30 between them, the spacers having sufficient surface area to cover and insulate the cathode tabs 24 to prevent them from glowing during operation of the tube. The stack of electrodes is locked on posts 26 and 28 by metallic eyelets 32 or the like suitably secured to the posts by crimping, welding, or the like.

Each cathode indicator electrode is provided with a fine wire connecting lead 34 which extends from the lower cathode tab 25 which is threaded on the lower post 28. Each lead is welded or otherwise secured at its free end to one of the pins 16. The leads 34 may be of the same material as the numbers or they may be of any suitable material.

The posts 26 and 28 comprise a portion of an electrode support assembly which also includes a first insulating disk 36 of mica or the like which is seated on the pins 16 and is oriented transverse to the longitudinal axis of the tube 10. The disk 36 is provided with a plurality of apertures 38 oriented on a common circumference and aligned with pins 16. Fastening means such as tubular metallic eyelets 40 are seated in the apertures 38. The eyelets are secured to pins 16 by crimping, welding, or the like, and rigid support is thus provided for the first disk 36 and ultimately the entire electrode assembly. The disk 36 is also provided with a central aperture 42 of sufficient length to allow all of the electrode leads 34 to pass therethrough. The first disk also includes a generally straight front edge 43 and, toward the rear of the disk, notches 44 and 46 formed in the periphery of the disk to provide a comparatively large-area rearwardly extending tongue 48.

A second insulating disk 50, of substantially the same size and shape as the first disk 36, is seated on the latter disk. The second disk includes a straight front edge 51, aligned with the front edge 43 of the first disk, and notches 52 and 54 aligned with the corresponding notches 44 and 46 in the first disk. The second disk is thus also provided with a rearwardly extending tongue 56 similar to the tongue 48. The second disk is also provided with a row of holes 58 which are self-aligned on a common axis which, in turn, is aligned with the central aperture 42 in the disk 36. The holes 58 are adapted to receive the electrode leads 34.

The electrode support assembly further includes a bracket 60 which is intended to impart considerable strength and rigidity to the assembly and, accordingly, is of metal. The bracket includes a base plate 62 and a back plate 64. The base plate includes a front edge 66 which is straight except for three locking tabs 68, 70, 72 which project therefrom. Rearwardly, the base plate 62 is provided with an upstanding plate 76 which interlocks with the back plate in a manner to be described. The base plate is also provided with a pair of rearwardly projecting tabs 78 and 80 which are aligned with the notches 44, 46 and 52, 54 in the first and second insulating disks 36 and 50. The base plate is also provided with a central elongated aperture 82 aligned with the row of holes 58 and through which the leads 34 pass. The base plate is seated on the second disk 50 and is secured thereto by means of the tabs 68 and 72 which are bent over and engage the front straight edges 43 and 51 of the disks 36 and 50 and thereby lock together the two disks. In addition, the two rear locking tabs 78 and 80 are similarly bent downwardly into the notches 44, 46 and 52, 54 to engage and secure together the rear portions of the disks. Thus, additional strength and rigidity are imparted to the electrode assembly.

The back plate 64 of the bracket includes a straight bottom edge 84, which rests on the top surface 86 of the base plate 62. The back plate also includes front and rear surfaces 88 and 90, respectively. The back plate is oriented in front of the upstanding plate 76 which is thus in contact with the rear surface 90 of the back plate. The back plate includes longitudinal side panels 92 and 94 which provide a locking action to be described below. A sheet 96 of insulating material, for example mica, including front and rear surfaces 98 and 100, is positioned with its front surface 98 in contact with the rear surface 90 of the back plate 64 and the upstanding plate 76. The side panels 92 and 94 of the back plate are bent back against the insulating sheet 96 and thereby hold this sheet and the back plate locked together in a unitary assembly known as the back plate assembly. Since the upstanding plate is thus rigidly secured to the back plate, the various parts of the bracket are thus securely held together.

The support posts 26 and 28 are secured to the bracket 60 in cantilever fashion as follows. The back plate [*64*] is provided with a pair of apertures 102 and 104 spaced apart and aligned on the longitudinal axis of the plate. The insulating sheet 96 similarly is provided with a pair of apertures 106 and 108 aligned with the apertures 102 and 104, respectively. The apertures 102 and 104 are larger than the apertures 106 and 108 for a purpose described below. Referring to FIG. 2, metal washers 110, 110′ and 112, 112′ are placed on either side of the insulating sheet aligned with the apertures 106 and 108, respectively. Locking eyelets are provided comprising metallic tubes 114 and 116, each having an annular collar 118 and 120 at about its center. The tubular eyelet 114 is inserted through the washers 110, 110′ and aperture 106, and the inner end 122 thereof is flattened (FIG. 1) against the washer 110 and thus holds the washer securely against the front surface 98 of the insulating sheet 96. The tubular eyelet 116 is similarly inserted through washers 112, 112′ and aperture 108 in sheet 96 and its front end 124 is flattened against washer 112 which is thus held securely against sheet 96. With this arrangement of parts, the annular collars 118 and 120 bear against the washers 110′ and 112′ and hold them securely against the rear surface 100 of the insulating sheet. The rods 26 and 28 are inserted in the eyelets 114 and 116, and the eyelets are crimped to secure them to the rods. This securing operation may also be achieved by welding or in any other suitable manner. Thus, the support rods 26 and 28 are secured to the bracket 60 parallel to each other and transverse to the longitudinal axis of the tube.

It may now be understood that the apertures 102 and 104 in the back plate 64 are of sufficiently large diameter so that electrical isolation is assured between the back plate and all adjacent metal parts, including the posts 26 and 28, the washers 110, 110′, 112, 112′, and the eyelets 114 and 116.

Additional strength and rigidity are imparted to the electrode support assembly by means of a brace 126 secured between the rod 28 and the insulating disks 36 and 50 and base plate 62. The brace comprises a tab of insulating material, such as mica, having two spaced-apart apertures 128 and 130 which are aligned vertically. The upper aperture is preferably circular to accommodate post 28 and the lower aperture 130 is preferably rectangular to accommodate locking tab 70. The lower post 28 passes through the upper aperture 128 and is supported therein, and the lower aperture 130 is aligned with and receives the center locking tab 70 of the base plate 62 of bracket 60. The locking tab 70 is bent downwardly against the brace 126 to thereby lock the brace in position against the assembly of disks 36 and 50 and base plate 62. In addition, a strengthening strut 132 comprising a straight metal rod or post and having apertures 134 and 136 at its ends is mounted on and extends between the support posts 26 and 28, preferably at the front end of the stack of cathodes, between the cathodes and the viewing window 20. The strut 132 thus supports the posts 26 and 28 with respect to each other and with respect to the bracket 60.

The bracket 60 is employed as part of the anode assembly of the tube 10. In order to achieve optimum operation of the bracket as the tube anode, a plurality of rods 138 and 140 are secured to the back plate 64 on both sides of the stack of cathodes 22. The rods extend outwardly toward the viewing window along the length of the stack of cathode electrodes. A metal strap 142 interconnects the vertically aligned rods 138 and a metal strap 144 interconnects the vertically aligned rods 140. Thus, effective anode surface is provided for all of the cathode electrodes. Electrical connection to the anode bracket 60 is made by means of a lead wire 146 secured to the lower surface 148 of locking tab 72 of base plate 62 and connected to one of the pins 16.

What is claimed is:

1. A *side view* cold cathode [,] gaseous indicator tube comprising an envelope *having a base and a viewing window and* containing a gaseous atmosphere adapted to sustain cathode glow, *a plurality of electrical leads extending through said base for connection to an external circuit,* a generally L-shaped electrode support bracket, a plurality of filamentary cathode glow electrodes *connected to said electrical leads, each of said cathode electrodes being shaped in the form of a character to be displayed and being positioned to face the viewing window in a plane transverse to said base,* a pair of support posts secured to said bracket for supporting said cathode electrodes at opposite portions thereof, [brace] *auxiliary* support means *coupled* between [said bracket and] said support posts, and [auxiliary] *brace* support means coupled between one of said support posts and said L-shaped bracket, said L-shaped bracket, said support posts, said [brace] *auxiliary* support means, and said [auxiliary] *brace* support means comprising a closed support loop for supporting said cathodes rigidly in said envelope.

2. The tube defined in claim 1 and including an anode electrode in operative relation to said cathode electrodes.

3. The tube defined in claim 1 and including a plurality of anode rods secured to said bracket and oriented in operative relationship to said cathode electrodes, at least a portion of said L-shaped bracket being operable as an anode electrode.

4. The tube defined in claim 1 wherein said filamentary cathode electrodes carry a pair of opposed apertured tabs which are threaded on said support posts, and said brace support means comprises a plate secured to said bracket and to one of said support posts for assisting in maintaining the rigidity of the electrode assembly.

5. The tube defined in claim 1 wherein said filamentary cathode electrodes carry a pair of opposed apertured tabs which are threaded on said support posts, said brace support means comprises a plate secured to said bracket and to one of said support posts for assisting in maintaining the rigidity of the electrode assembly, and said auxiliary support means comprises a rigid bar connected between said support posts.

6. The tube defined in claim 1 wherein said support posts are vertically aligned one above the other and are secured to the back plate of said bracket, and said filamentary cathode electrodes carry a pair of opposed apertured tabs which are threaded on said support posts, said brace support means comprises a plate secured between the base plate of said bracket and the lower one of said support posts for assisting in maintaining the rigidity of the electrode assembly, and said auxiliary support means comprises a rigid bar connected between said support posts.

7. A *side view* cold cathode [,] gaseous indicator tube comprising an envelope *having a base and a viewing window and* containing a gaseous atmosphere adapted to sustain cathode glow, *a plurality of electrical leads extending through said base for connection to an external electric circuit,* a generally L-shaped conductive electrode support bracket including a base plate and a back plate, said back plate having a front surface and a rear surface, a sheet of insulating material adjacent to the rear surface of said back plate, means holding said back plate and said sheet of insulating material in a unitary rigid assembly, a first pair of apertures in said back plate, a second pair of apertures in said sheet and aligned with said first pair of apertures, a plurality of filamentary cathode glow electrodes *connected respectively to said electrical leads, each of said cathode electrodes being shaped in the form of a character to be displayed and disposed in a plane substantially perpendicular to the base of the envelope,* a pair of support posts extending through said first pair of apertures in said back plate and secured to said sheet of insulating material, said posts being insulated from said back plate and supporting said cathode electrodes, a brace support secured between one of said posts and the base plate of said bracket, a rigid bar secured between said posts for maintaining said support posts and said electrodes rigid within said envelope, and anode electrode rods secured to said back plate and lying in operative relation to said cathode electrodes.

*8. A side view cathode glow tube comprising an envelope having a base and a viewing window, a gaseous atmosphere within said envelope at a pressure capable of sustaining cathode glow, a plurality of character-shaped cathode electrodes within said envelope, each having a pair of apertured tabs extending outwardly from said character, support means within said envelope for mounting said cathode electrodes to face said viewing window in planes substantially perpendicular to said envelope base, said support means including a plate-like base member disposed substantially parallel to said envelope base, a plate-like upright member extending substantially perpendicular from said base member, a pair of support posts supported substantially perpendicularly from said upright member at points spaced apart a distance corresponding to the distance between the apertured tabs of the cathode electrodes, an auxiliary support member connected between said support posts at a point along said posts spaced from said upright plate member, a brace connected to one of said support posts and extending between such post and said base member to provide a rigid support for said character-shaped cathodes.*

*9. A side view cathode glow tube comprising an envelope having a base and a viewing window, a gaseous atmosphere within said envelope at a pressure capable of sustaining cathode glow, a plurality of rigid conductive pins extending through said envelope base, a plurality of character-shaped cathode electrodes within said envelope connected electrically to respective ones of said conductive pins, each of said cathode electrodes having a pair of apertured tabs extending outwardly from said character at opposite points thereof, support means within said envelope for mounting said cathode electrodes to face said viewing window in planes substantially perpendicular to said envelope base, said support means including a plate-like base member substantially parallel to said envelope base, a plate-like upright member extending substantially perpendicular from said base member, the base member and upright member being supported from at least one of said conductive pins, a pair of support posts supported substantially perpendicularly from said upright member at points spaced apart a distance corresponding to the distance between the apertured tabs of the cathode electrodes, an auxiliary support member connected between said support posts at a point along said posts spaced from said upright plate member, a brace connected to one of said support posts and extending between such post and said base member to provide a rigid support for said character-shaped cathodes.*

*10. A side view cathode glow tube as in claim 9 including a plurality of electrical leads connected between said cathode electrodes and said conductive pins, said pins being disposed in a circular array about the envelope base, the plate-like base member having at least one aperture lying along a diametral line thereof, the electrical leads passing through said at least one aperture and then passing in different directions to said conductive pins for lending additional rigidity to said support means.*

*11. A side view cathode glow tube comprising an envelope having a base and a viewing window, a gaseous atmosphere within said envelope at a pressure capable of sustaining cathode glow, a plurality of character-shaped cathode electrodes within said envelope, each having a pair of apertured tabs extending outwardly from said character, support means within said envelope for mounting said cathode electrodes to face said viewing window in planes substantially perpendicular to said envelope base, said support means including a plate-like base member disposed substantially parallel to said envelope base, a plate-like upright electrode member extending substantially perpendicular from said base member, a pair of support posts supported substantially perpendicularly from said upright member at points spaced apart a distance corresponding to the distance between the apertured tabs of the cathode electrodes, an auxiliary support rod connected between said support posts at a point along said posts spaced from said upright plate member, a brace connected to one of said support posts near one end thereof and extending between such post and said base member to provide a rigid support for said character-shaped cathodes.*

References Cited in the file of this patent or the original patent

UNITED STATES PATENTS

| | | |
|---|---|---|
| 2,618,760 | Hancock et al. | Nov. 18, 1952 |
| 2,874,320 | Hampel | Feb. 17, 1959 |
| 2,878,407 | Engleman et al. | Mar. 17, 1959 |
| 2,906,906 | McCauley et al. | Sept. 29, 1959 |